UNITED STATES PATENT OFFICE.

JESSE H. ALLISON, OF CHARLOTTESVILLE, INDIANA.

IMPROVEMENT IN LATCHES FOR GATES AND DOORS.

Specification forming part of Letters Patent No. 119,552, dated October 3, 1871.

*To all whom it may concern:*

Be it known that I, JESSE H. ALLISON, of Charlottesville, in the county of Hancock and State of Indiana, have invented certain new and useful Improvements in Gate and Door-Latches; and I do hereby declare that the following is a full, clear, and exact description thereof, reference being had to the accompanying drawing and to the letters of reference marked thereon which form a part of this specification.

The nature of my invention consists in the construction and arrangement of a gate-latch, as will be hereinafter more fully set forth.

In order to enable others skilled in the art to which my invention appertains to make and use the same, I will now proceed to describe its construction and operation, referring to the annexed drawing, in which—

Figure 1:
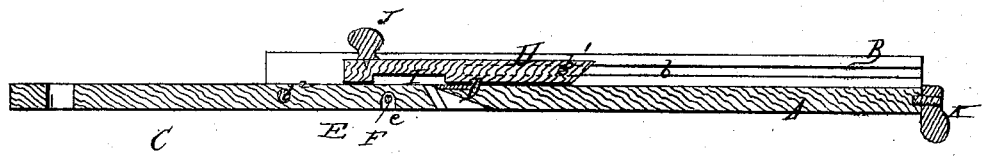
Figure 2:
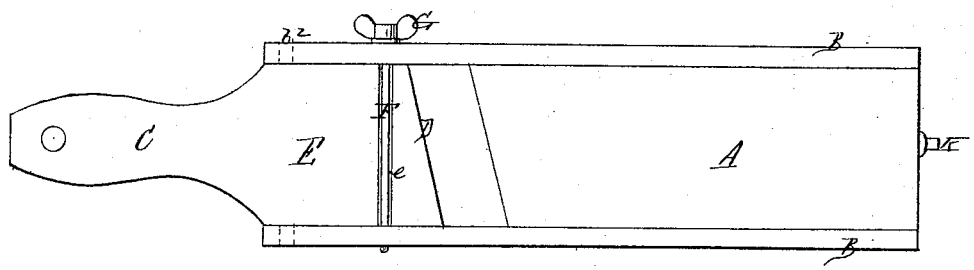

Figure 1 is a side view of a gate with my latch attached, and Fig. 2 is an enlarged view.

A represents a gate of any desired construction, to which at a suitable height is attached a horizontal bar, B. This bar extends beyond the outer end of the gate, as shown. C represents a long screw provided with an elliptical-shaped head, D, and is screwed into the gate-post E at a height to correspond with the horizontal bar B on the gate. Upon the screw C is placed a hollow sleeve, G, having a spool-rim, as shown, and from which extends outward and downward a wing, H, said wing being on its inner edge provided with a flange, I. This gate can be locked securely against children simply by turning the wing so as to tighten the screw-bolt or pin C, when the bar B will not pass the wing or arm H of the latch by reason of the bolt-head D being thrown forward. It might be thrown further forward and made tighter; still the flange I will prevent the bar from passing. To unlock the gate take hold of the wing H and unscrew about one-third round, so as to leave the wing vertical or slightly inclined out; the latch is then in proper position for general use and the wing will raise on line with the bolt. The spool-rim on the hollow sleeve G is designed to obviate the necessity of a washer. The hole in the sleeve G through which the screw passes is not of uniform size but smaller in the middle, thereby lessening the friction and rendering the object movement much easier and better, and prevents any wearing of the same.

Having thus fully described my invention, what I claim as new, and desire to secure by Letters Patent, is—

The combination of the screw C with elliptic head D, sleeve G, wing H, and flange I, all constructed and arranged as shown and described, and used with a horizontal bar, B, on the gate, substantially as and for the purposes herein set forth.

In testimony that I claim the foregoing as my own I affix my signature in the presence of two witnesses.

J. H. ALLISON.

Witnesses:
  GEORGE W. DAILEY,
  JOSEPH F. SHULTZ.

(62)

[34.]

H. BALDWIN.

Improvement in Vegetable Cutters.

No. 119,553.  Patented Oct. 3, 1871.

Witnesses  Inventor